(12) United States Patent
Kucera et al.

(10) Patent No.: US 12,526,888 B2
(45) Date of Patent: Jan. 13, 2026

(54) CONTROL INTEGRATED CIRCUIT FOR CONTROLLING AN OPERATING DEVICE FOR LIGHTING MEANS; OPERATING DEVICE; LUMINAIRE AND METHOD FOR OPERATING A CONTROL INTEGRATED CIRCUIT

(71) Applicant: Tridonic GmbH & Co KG, Dornbirn (AT)

(72) Inventors: Clemens Kucera, Blundenz (AT); Hans Auer, Dornbirn (AT); Lukas Saccavini, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 25 days.

(21) Appl. No.: 18/704,540

(22) PCT Filed: Nov. 17, 2022

(86) PCT No.: PCT/EP2022/082242
§ 371 (c)(1),
(2) Date: Apr. 25, 2024

(87) PCT Pub. No.: WO2023/099230
PCT Pub. Date: Jun. 8, 2023

(65) Prior Publication Data
US 2025/0008622 A1    Jan. 2, 2025

(30) Foreign Application Priority Data
Dec. 2, 2021 (EP) ..................... 21211864

(51) Int. Cl.
*H05B 45/305*    (2020.01)
(52) U.S. Cl.
CPC ................. *H05B 45/305* (2020.01)

(58) Field of Classification Search
CPC ...... H05B 45/10; H05B 45/00; H05B 45/305; H05B 45/30; H05B 45/335
See application file for complete search history.

(56) References Cited

U.S. PATENT DOCUMENTS

| 2015/0323588 | A1* | 11/2015 | Peng | ...................... | H05B 47/20 363/21.01 |
|---|---|---|---|---|---|
| 2017/0034884 | A1 | 2/2017 | Fan et al. | | |
| 2018/0130407 | A1 | 5/2018 | Zhai | | |

OTHER PUBLICATIONS

PCT/EP2022/082242, International Search Report and Written Opinion, dated Feb. 24, 2023, 7 pages.

* cited by examiner

*Primary Examiner* — Sanjiv D. Patel
(74) *Attorney, Agent, or Firm* — Andrus Intellectual Property Law, LLP

(57) ABSTRACT

The invention relates to a control integrated circuit (1), control IC, for controlling an operating device (15) for lighting means (10). The control IC (1) comprises a driver logic (3a) for driving a hardware module (4a), a control logic (2a) for controlling the driver logic (3a), and a clock generator (5) for generating two or more clock signals (clk1, clk2) that have a different frequency with regard to each other. The clock generator (5) is configured to provide a first clock signal (clk1) of the two or more clock signals (clk1, clk2) to the control logic (2a), and a second clock signal (clk2) of the two or more clock signals (clk1, clk2) to the driver logic (3a). The invention further relates to an operating device (15) for lighting means, the operating device (15) comprising such a control IC (1); and to a luminaire comprising such an operating device (15).

16 Claims, 4 Drawing Sheets

CONTROL INTEGRATED CIRCUIT FOR CONTROLLING AN OPERATING DEVICE FOR LIGHTING MEANS; OPERATING DEVICE; LUMINAIRE AND METHOD FOR OPERATING A CONTROL INTEGRATED CIRCUIT

CROSS REFERENCE TO RELATED APPLICATIONS

The present application is the U.S. national stage application of international application PCT/EP2022/082242 filed Nov. 17, 2022, which international application was published on Jun. 8, 2023 as International Publication WO 2023/099230 A1. The international application claims priority to European Patent Application No. 21211864.0 filed Dec. 2, 2021.

BACKGROUND AND SUMMARY

The invention relates to a control integrated circuit (control IC) for controlling an operating device for lighting means; an operating device for lighting means, the operating device comprising such a control IC; and a luminaire comprising such an operating device. The invention further relates to a method for operating a control IC.

Lighting means, such as light emitting diodes (LEDs), may be used for providing lighting to an area, such as an indoor area or outdoor area. To electrically supply and control light emission of the lighting means operating means may be used, which may be referred to as operating device for lighting means. A control integrated circuit (control IC) is an electrical circuit that may be used for controlling an operating device for lighting means. Examples of a control IC are an application specific integrated circuit (ASIC) and a field programmable gate array (FPGA).

The control IC may comprise a driver logic for driving a hardware module, such as a hardware module of the operating device, and a control logic for controlling the driver logic. The operating device may comprise different hardware modules with different electrical characteristics for operating the lighting means. For example, hardware modules of an operating device for lighting means, which hardware modules are controllable by a control unit (e.g. the aforementioned control IC), may comprise a power factor control circuit (PFC circuit), a current source for providing current to the lighting means etc.

In the light of the above, it is an object of the invention to provide a control IC for controlling an operating device for lighting means, wherein the control IC is flexible with regard to controlling different types of hardware modules. It is in particular an object of the invention to provide a control IC for controlling an operating device for lighting means, which allows a flexible operation of one or more hardware modules of an operating device for lighting means, when the operating device is controlled by the control IC.

These and other objects, which become apparent upon reading the following description, are solved by the subject-matter of the independent claims. The dependent claims refer to preferred embodiments of the invention.

In the following the term "electrically connect" may be abbreviated by the term "connect".

According to a first aspect of the invention, a control integrated circuit (control IC) for controlling an operating device for lighting means is provided. The lighting means are optionally at least one light emitting diode (LED). The control IC comprises a driver logic for driving a hardware module, a control logic for controlling the driver logic, and a clock generator for generating two or more clock signals that have a different frequency with regard to each other. The clock generator is configured to provide a first clock signal of the two or more clock signals to the control logic, and a second clock signal of the two or more clock signals to the driver logic.

That is, the first aspect of the invention proposes a control IC with a driver logic for driving a hardware module and a control logic for controlling the driver logic, wherein different frequencies are used for clocking the control logic and the driver logic. This is achieved by a clock generator of the control IC that is configured to generate two or more clock signals having a different frequency with regard to each other.

Since the driver logic and the control logic of the control IC are clocked with different frequencies, the driver logic may be adapted to the hardware module that is to be driven by the driver logic. In other words, the driver logic may be operated or clocked with a frequency which is optimally adapted to drive the hardware module. This does not have an effect on the control logic of the control IC, because the control IC is configured to clock the control logic with a clock signal (first clock signal) having a different frequency than the clock signal (second clock signal) usable by the control IC for clocking the driver logic. Thus, the clock of the control logic may stay the same, so that a control, e.g. loop-control, which may be implemented in the control logic, may have the same behavior for different clock setups of the driver logic (i.e. different values of the frequency of the second clock signal)

Providing different clock signals having different frequencies to the control logic and the driver logic allows the frequency with which the driver logic is clocked (i.e. the frequency of the second clock signal) to be adapted to the working frequency of the hardware module type to be driven by the driver logic of the control IC. Namely, different hardware module types may operate in different frequency ranges. Therefore, the control IC of the first aspect is flexible with regard to driving different types of hardware modules. In other words, the control IC is more flexible with regard to clocking its components compared to a control IC using a single clock for clocking its components. Thus, the control IC of the first aspect may be used for driving different hardware-setups, which need either slower drive-signals or faster drive-signals in dependence on their hardware design. That is, the driver logic may work with different clocks (depending on the frequency of the second clock signal) and generate different time-based signals to drive the hardware module in an optimized way.

Since the control IC allows adapting the clocking of the driver logic (i.e. adapting the frequency of the second clock signal) to the clocking of the hardware module to be electrically connected to the driver logic, as outlined above, the driver logic of the control IC may be configured to better react (e.g. smaller reaction time) to the hardware module and, thus, better drive the hardware module, when the hardware module is electrically connected to the driver logic, compared to a control IC in which a single clock signal is used for clocking the components of the control IC. Thus, this allows a better communication or transmission of information between the driver logic and the hardware module and a better driving or control of the hardware module by the driver logic, when the hardware module is connected to the driver logic.

When a single clock signal is used for clocking the components of a control IC, this clock signal is set in order to suit all components, e.g. the control logic and the driver logic. Thus, a driver logic clocked by such a single clock signal may not necessarily be well suited for driving a hardware module clocked with a different frequency than the frequency of the single clock signal. With regard thereto, the control IC of the first aspect is advantageous for the reasons provided above.

The two or more clocks signals that may be generated by the clock generator are to be understood as two or more inner system clock signals (inner system clocks) of the control IC. The term "clock signal" may be abbreviated by the term "clock". The frequency of the first clock signal is different to the frequency of the second clock signal.

The control IC may be an application specific integrated circuit (ASIC) or a field programmable gate array (FPGA).

The control logic, the driver logic and the clock generator may be implemented by hardware and/or software. The terms "control part", "control block" and "control module" may be used as synonyms for the term "control logic". The terms "driver part", "driver block" and "driver module" may be used as synonyms for the term "driver logic".

The clock generator may be configured to change the frequency of at least one clock signal of the two or more clock signals. Optionally, the clock generator is configured to change the frequency of each clock signal of the two or more clock signals. For example, the clock generator may be configured to change the second frequency of the two or more clock signals.

This has the benefit that the frequency with which a component of the control IC is clocked may be changed. For example changing the frequency of the second clock signal for clocking the driver logic allows adapting the frequency of the second clock to a frequency with which a hardware module is clocked, which is to be electrically connected to the driver logic. That is, changing the frequency of the second clock allows adapting the clocking of the driver logic to the clocking of the hardware module to be driven by the driver logic.

The clock generator may be configured to change the frequency of the at least one clock signal of the two or more clock signals at start-up of the control IC. Optionally, the clock generator is configured to change the frequency of each clock signal of the two or more clock signals at start-up of the control IC.

Alternatively, or additionally the clock generator may be configured to change the frequency of the at least one clock signal, optionally each clock signal, of the two or more clock signals during operation of the operating device. This may occur during a clock adaptation phase. The clock adaptation phase may be triggered by a person and/or a hardware module, when the hardware module is electrically connected to the driver logic of the control IC.

The clock generator may be configured to adapt the second clock signal to the working frequency of the hardware module. That is, the clock generator may be configured to adapt the frequency of the second clock signal to the working frequency of the hardware module that is to be driven by the driver logic. The working frequency of the hardware module may be understood as the frequency at which the hardware module is operated or clocked during operation.

The greater the working frequency of the hardware module the greater may be the frequency of the second clock signal (i.e. the faster the second clock signal) and vice versa. Thus, the driver logic may be configured to drive the hardware module with a faster reaction time, in case the frequency of the second clock signals is increased.

The clock generator may be configured to provide in the clock generator the two or more frequencies that may be adjustable. The frequencies of at least one or each of the two or more clock signals may be adjustable.

Optionally, the clock generator is configured to generate, using an oscillator, a base clock signal, the base clock signal having a maximum frequency. The clock generator may be configured to generate, based on the base clock signal, at least one clock signal of the two or more clock signals, the at least one clock signal having a frequency equal to or smaller than the maximum frequency. Optionally, the clock generator may be configured to generate, based on the base clock signal, each clock signal of the two or more clock signals, each clock signal having a respective frequency equal to or smaller than the maximum frequency.

In other words, a base clock signal, generated using an oscillator, may be used for generating one or more, optionally each, of the two or more clock signals, wherein the respective clock signal has a frequency that is equal to or smaller than the frequency of the base clock signal.

The at least one clock signal of the two or more clock signals may be the second clock signal. The maximum frequency may be understood as the highest or greatest frequency that is providable in the control IC. For example, the maximum frequency may correspond to the greatest or highest frequency among different working frequencies of different hardware module types that are to be controlled by the control IC, e.g. driven by the driver logic of the control IC. That is, the control IC may be configured to drive a set of different hardware modules when the maximum frequency of the base clock signal is equal to the greatest or highest frequency among the working frequencies of the different hardware modules, wherein the working frequencies may be different to each other. The maximum frequency of the base clock signal may be referred to by only frequency of the base clock signal or by base frequency.

Optionally, the clock generator is configured to generate the base clock signal using a phase-locked loop (PLL). In addition or alternatively, the clock generator may be configured to generate, based on the base clock signal, the at least one clock signal having a frequency smaller than the maximum frequency by reducing via a divider the maximum frequency of the base clock signal to the frequency of the at least one clock signal. Optionally, the clock generator may be configured to generate, based on the base clock signal, each clock signal having a respective frequency smaller than the maximum frequency by reducing via a divider the maximum frequency of the base clock signal to the respective frequency of the respective clock signal.

Optionally, the driver logic is configured to provide a control signal for driving the hardware module. The control signal is optionally a pulse-width modulation (PWM) signal. The driver logic may be configured to receive information from the hardware module and provide the information to the control logic, when the hardware module is electrically connected to the driver logic. Optionally, the driver logic is configured to receive measurement signals from the hardware module and provide the measurement signals to the control logic, when the hardware module is electrically connected to the driver logic.

The control signal that may be providable by the driver logic for driving the hardware module is not limited to a PWM signal and, thus, may be any other type of control signal. The control logic may be configured to process and use the information, such as measurement signals, received from the driver logic.

The driver logic that may be configured to receive information, e.g. measurement signals, from the hardware module (when being connected to the driver logic) may be referred to as driver-sense logic. The term "sense signal" may be used as a synonym for the term "measurement signal". A measurement signal may be understood as a signal or information representing a measurement result or sensing result of measurement means or a sensor.

Examples of measurement means may comprise measurement means for measuring electrical parameters, such as voltage, current, electrical power, etc. For example, a measurement means for measuring current may be or may comprise a shunt resistor. A measurement means for measuring voltage may be or may comprise a voltage divider, coupled inductors etc. Examples of a sensor may comprise temperature sensors, light sensors, movement and/or presence sensors etc. A measurement signal provided by a sensor may be referred to as sensor signal.

The control logic may be configured to receive information from outside. Optionally, the control logic is configured to receive information from a microcontroller outside the control IC. In addition or alternatively, the clock generator may be configured to receive information from outside. Optionally, the clock generator is configured to receive information from a microcontroller outside the control IC. The information may be information on the factor by which the frequency of the at least one clock signal is smaller than the maximum frequency of the base clock signal.

The information that may be receivable by the control logic of the control IC from outside may comprise control information (e.g. control parameters) with regard to controlling the hardware module. In addition, the information may comprise information from components or modules outside the control IC, such as one or more sensors. Thus, the information may comprise measurement signals, e.g. a measured light level, temperature, occupancy etc.

The information that may be receivable by the clock generator of the control IC from outside may be information with regard to the two or more clock signals that may be generated by the clock generator of the control IC (e.g. parameters for generating the two or more clock signals). For example, this information may comprise information on which frequency of the two or more frequencies is to be changed; and/or on the frequency (e.g. working frequency) to which the frequency of a respective clock signal (that is to be changed) is to be adapted to. Optionally, this information may comprise information on the factor by which the frequency of the at least one clock signal is smaller than the maximum frequency of the base clock signal, the frequency of the first lock signal and/or the frequency of the second clock signal.

The information from outside may be provided by a person or user, optionally via a microcontroller.

Optionally, the control IC comprises at least one further driver logic and the control logic is configured to control the at least one further driver logic. The clock generator may be configured to provide the second clock signal to the at least one further driver logic, or a third clock signal of the clock signals to the at least one further driver logic.

With other words, when the control IC comprises two or more driver logics at least two of the two or more driver logics may be provided with the same clock signal (second clock signal) and, thus, may be clocked with the same frequency. This allows driving, by the control IC, two or more hardware modules having the same working frequency (i.e. being operated or clocked with the same frequency) at the same time Optionally, when the control IC comprises two or more driver logics, the two or more driver logics may be provided with the same clock signal (second clock signal) and, thus, may be clocked with the same frequency.

When the control IC comprises two or more driver logics, at least one of the two or more driver logics may be provided with a clock signal (e.g. the third clock signal) having a different frequency compared to the second clock signal. This allows driving, by the control IC, at least two hardware modules at the same time that have a different working frequency.

The above description with regard to the driver logic may be correspondingly valid for the at least one further driver logic. The above description with regard to the driver logic may be correspondingly valid for each further driver logic.

Optionally, the control IC comprises at least one further driver logic and at least one further control logic. The at least one further control logic is configured to control the at least one further driver logic. The clock generator may be configured to provide the second clock signal to the at least one further driver logic, or a third clock signal of the clock signals to the at least one further driver logic. The clock generator may be configured to provide the first clock signal to the at least one further control logic, or a fourth clock signal of the clock signals to the at least one further control logic.

With other words, when the control IC comprises two or more driver logics, the two or more driver logic may be controlled by the same control logic. Alternatively, the control IC may comprise at least one further control logic for controlling at least one driver logic of the two or more driver logics.

When the control IC comprises two or more control logics, at least two of the two or more control logics may be provided with the same clock signal (first clock signal) and, thus may be clocked with the same frequency. Optionally, when the control IC comprises two or more control logics, the two or more control logics may be provided with the same clock signal (first clock signal) and, thus, may be clocked with the same frequency.

When the control IC comprises two or more control logics, at least one of the two or more control logics may be provided with a clock signal (e.g. the fourth clock signal) having a different frequency compared to the first clock signal.

The above description with regard to the control logic may be correspondingly valid for the at least one further control logic. The above description with regard to the control logic may be correspondingly valid for each further control logic.

In order to achieve the control IC according to the first aspect of the invention, some or all of the above described optional features may be combined with each other.

According to a second aspect of the invention, an operating device for lighting means is provided. The lighting means are optionally at least one light emitting diode (LED). The operating device comprises a control IC according to the first aspect, as described above; and one or more hardware modules. The one or more hardware modules are optionally a power factor control circuit (PFC circuit) and/or a current source for providing current to the lighting means. The control IC is configured to control the one or more hardware modules.

In case the operating device is for LEDs, the term "LED-driver" may be used as a synonym for the term "operating device". The operating device may be a ballast for lighting means, such as at least one LED.

The one or more hardware modules may be electrically connected with the control IC for being controlled by the control IC. Each hardware module of the one or more hardware module may be connected to a respective driver logic of the control IC and, thus, driven by the respective driver logic. The control IC may comprise for each hardware module of the operating device a respective driver logic.

The PFC circuit may be voltage supply circuit that is configured to perform a PFC function. The PFC circuit may be an actively switched PFC circuit with at least one switch. The control IC may be configured to control switching of the at least one switch of the PFC circuit. Optionally, a respective driver logic of the control IC may be configured to drive the actively switched PFC circuit by providing a control signal for switching the at least one switch of the actively switch PFC circuit. The actively switched PFC circuit may be electrically connected to the respective driver logic. The actively switched PFC circuit may comprise or may be an actively switched DC/DC converter with at least one switch.

The current source may be an actively switched DC/DC converter with at least one switch. The control IC may be configured to control switching of the at least one switch of the actively switched DC/DC converter. Optionally, a respective driver logic of the control IC may be configured to drive the actively switched DC/DC converter by providing a control signal for switching the at least one switch of the actively switched DC/DC converter. The actively switched DC/DC converter may be electrically connected to the respective driver logic.

Examples of an actively switched DC/DC converter comprise a buck-converter, boost-converter, buck-boost-converter, flyback converter, resonance converter etc.

The term "actively clocked DC/DC converter" may be used as a synonym for the term "actively switched DC/DC converter". The at least one switch may be or may comprise one or more transistors. Examples of transistors comprise field-effect transistors (FETs), e.g. metal-oxide semiconductor FETs (MOSFETs); bipolar junction transistors (BJTs); insulated gate bipolar transistors (IGBTs) etc.

The one or more hardware modules may be switched mode power supplys (SMPS) in the form of one or more AC/DC converters and/or one or more DC/DC converters The operating device may comprise a microcontroller. The microcontroller may be configured to provide information to the control logic of the control IC. Optionally, the microcontroller is configured to provide information to the control logic and the at least one further control logic of the control IC. The microcontroller may be configured to provide information to the clock generator. Optionally, the microcontroller is configured to provide to the clock generator information on the factor by which the frequency of the at least one clock signal is smaller than the maximum frequency of the base clock signal.

The microcontroller and the control IC may form or represent a control system of the operating device for controlling the one or more hardware modules of the operating device. The microcontroller may be configured to communicate with outside the operating device, e.g. an external device arranged outside the operating device. The microcontroller may be configured to receive information from a person or user of the operating device. Such information may comprise information on how to control the operating device (e.g. control the one or more hardware modules) in order to control light emission by the lighting means. The information may comprise control information (e.g. control parameters) with regard to controlling the one or more hardware modules and information with regard to the two or more clock signals that may be generated by the clock generator of the control IC (e.g. parameters for generating the two or more clock signals). In addition, the information may comprise information from other electrical components of the operating device and/or components or modules outside the operating device, such as one or more sensors. Thus, the information may comprise measurement signals, e.g. a measured light level, temperature, occupancy etc. at the environment of the operating device and/or the lighting means.

The control information may comprise information with regard to the one or more hardware modules that is usable by the control logic, the optional at least one further control logic and optionally by the driver logic and the optional at least one further driver logic for controlling operation of the one or more hardware modules. For example, the control information may comprise a reference voltage for a feedback control of a voltage providable by the optional PFC circuit of the operating device, a reference current for a feedback control of a current providable by the optional current source, a reference light emission for a feedback control of the light emission of the lighting means that may be operated by the operating device etc.

The information with regard to the two or more clock signals may comprise information on the factor by which the frequency of the at least one clock signal is smaller than the maximum frequency of the base clock signal, a respective working frequency of the one or more hardware modules, a respective clock frequency with which the control logic and the optional at least one further control logic are to be clocked etc. In addition or alternatively, the information with regard to the two or more clock signals may comprise the different frequencies of the two or more clock signals, e.g. the frequency of the first clock signal and/or the frequency of the second clock signal.

The microcontroller may be configured to provide or communicate the above described control information to the control logic and to the optional at least one further control logic of the control IC. The microcontroller may be configured to provide or communicate the above described control information to the drive logic and optional at least one further drier logic of the control IC. The microcontroller may be configured to provide or communicate the above described information with regard to the two or more clock signals to the clock generator of the control IC.

The control logic may be configure to control, based on information received from the microcontroller, the driver logic and optionally the optional at least one further driver logic for controlling operation of the one or more hardware modules. For this, the driver logic and the optional at least one further driver logic are configured to drive, according to their control, the one or more hardware modules. Optionally, the optional at least one further control logic may be configure to control, based on information received from the microcontroller, the optional at least one further driver logic for controlling operation of a respective hardware module of the hardware modules. For this, the optional at least one further driver logic may be configured to drive, according to its control, the respective hardware module.

Optionally, the control IC comprises for each hardware module of the one or more hardware modules a respective driver logic. Each of the one or more hardware modules may be electrically connected to the respective driver logic of the control IC. At least one of the one or more hardware modules may be configured to provide information, optional measurement signals, to the respective driver logic of the control IC. Optionally, each of the one or more hardware modules is configured to provide information, optional measurement signals, to the respective driver logic of the control IC.

The respective driver logic may be configured to provide the received information, e.g. measurements signals, to the control logic controlling the respective driver logic. The respective driver logic or the control logic controlling the respective driver logic may be configured to provide the received information to outside, for example to the optional microcontroller of the operating device.

The above description with regard to the control IC according to the first aspect of the invention is also valid for the operating device according to the second aspect of the invention.

The operating device according to the second aspect of the invention achieves the same advantages as the control IC according to the first aspect of the invention.

In order to achieve the operating device according to the second aspect of the invention, some or all of the above described optional features may be combined with each other.

According to a third aspect of the invention, a luminaire is provided. The luminaire comprises an operating device according to the second aspect, as described above; and lighting means. The lighting means are optionally at least one light emitting diode (LED). The operating device is configured to operate the lighting means.

The above description with regard to the control IC according to the first aspect of the invention and the operating device according to the second aspect of the invention is also valid for the luminaire according to the third aspect of the invention.

The lighting means may comprise or be one or more lighting elements. The lighting means are not limited to being at least one LED (i.e. one or more LEDs) and, thus, may additionally or alternatively be at least one other lighting means type.

The luminaire according to the third aspect of the invention achieves the same advantages as the control IC according to the first aspect of the invention.

According to a fourth aspect of the invention, a method for operating a control IC is provided, the control IC comprising a driver logic and a control logic for controlling the driver logic. The method comprises: generating two or more clock signals that have a different frequency with regard to each other; providing a first clock signal of the two or more clock signals to the control logic, and providing a second clock signal of the two or more clock signals to the driver logic.

The method may comprise changing the frequency of at least one clock signal of the two or more clock signals. Optionally, the method comprises changing the frequency of each clock signal of the two or more clock signals.

The method may comprise changing the frequency of the at least one clock signal of the two or more clock signals at start-up of the control IC. Optionally, the method comprises changing the frequency of each clock signal of the two or more clock signals at start-up of the control IC.

Optionally, the method comprises adapting the second clock signal to the working frequency of a hardware module, wherein the driver logic is a driver logic for driving the hardware module.

Optionally, the method comprises generating, using an oscillator, a base clock signal, the base clock signal having a maximum frequency. The method my comprise generating, based on the base clock signal, at least one clock signal of the two or more clock signals, the at least one clock signal having a frequency equal to or smaller than the maximum frequency. Optionally, the method comprises generating, based on the base clock signal, each clock signal of the two or more clock signals, each clock signal having a respective frequency equal to or smaller than the maximum frequency.

Optionally, the method comprises generating the base clock signal using a phase-locked loop (PLL). In addition or alternatively, the method may comprise generating, based on the base clock signal, the at least one clock signal having a frequency smaller than the maximum frequency by reducing via a divider the maximum frequency of the base clock signal to the frequency of the at least one clock signal. Optionally, the method comprises generating, based on the base clock signal, each clock signal having a respective frequency smaller than the maximum frequency by reducing via a divider the maximum frequency of the base clock signal to the respective frequency of the respective clock signal.

Optionally, the method comprises providing, by the driver logic, a control signal for driving a hardware module. The control signal is optionally a pulse-width modulation (PWM) signal. The method may comprise receiving, by the driver logic, information from the hardware module and providing, by the driver logic, the information to the control logic, when the hardware module is electrically connected to the driver logic. Optionally, the method comprises receiving, by the driver logic, measurement signals from the hardware module and providing, by the driver logic, the measurement signals to the control logic, when the hardware module is electrically connected to the driver logic.

The method may comprise receiving, by the control logic, information from outside. Optionally, the method comprises receiving, by the control logic, information from a microcontroller outside the control IC. In addition or alternatively, the method may comprise receiving, by a clock generator of the control IC, information from outside. Optionally, the method comprises receiving, by the clock generator, information from a microcontroller outside the control IC. The information may be information on the factor by which the frequency of the at least one clock signal is smaller than the maximum frequency of the base clock signal.

Optionally, the control IC comprises at least one further driver logic and the control logic is configured to control the at least one further driver logic. The method may comprise providing the second clock signal to the at least one further driver logic, or a third clock signal of the clock signals to the at least one further driver logic.

Optionally, the control IC comprises at least one further driver logic and at least one further control logic. The at least one further control logic is configured to control the at least one further driver logic. The method may comprise providing the second clock signal to the at least one further driver logic, or a third clock signal of the clock signals to the at least one further driver logic. The method may comprise providing the first clock signal to the at least one further control logic, or a fourth clock signal of the clock signals to the at least one further control logic.

The above description with regard to the control IC according to the first aspect of the invention is also valid for the method according to the fourth aspect of the invention.

The method according to the fourth aspect of the invention achieves the same advantages as the control IC according to the first aspect of the invention.

In order to achieve the method according to the fourth aspect of the invention, some or all of the above described optional features may be combined with each other.

It has to be noted that all devices, elements, units and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities.

BRIEF DESCRIPTION OF THE DRAWINGS

In the following, the invention is described exemplarily with reference to the enclosed Figures, in which.

DETAILED DESCRIPTION OF THE DRAWINGS

In the Figures, corresponding elements have the same reference signs.

Figure 1:
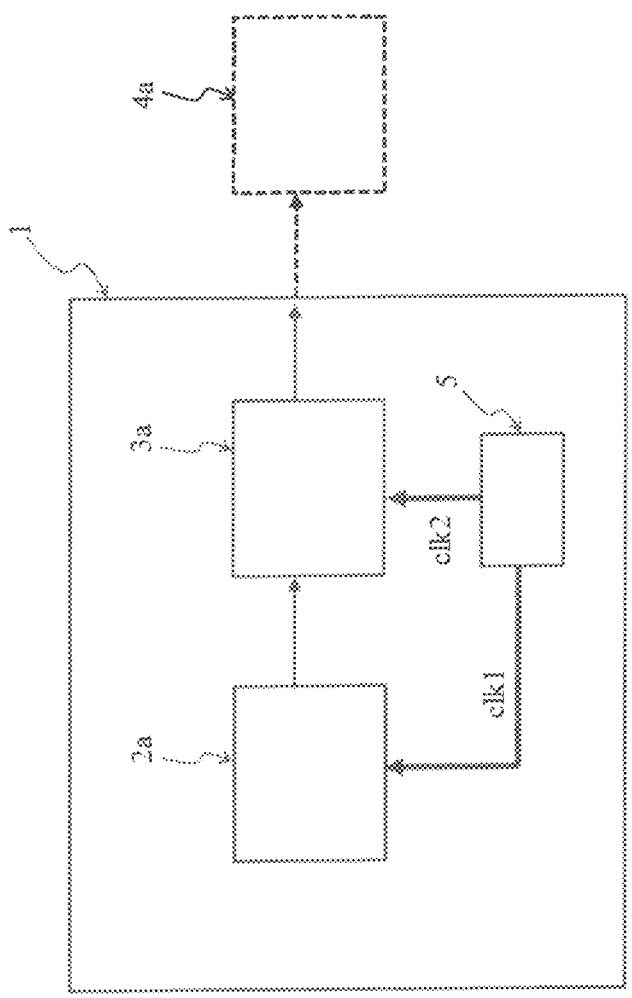
FIG. 1 shows a block diagram of a control integrated circuit (control IC) according to an embodiment of the invention.

FIG. 1 shows a block diagram of a control integrated circuit (control IC) according to an embodiment of the invention. The control IC 1 of FIG. 1 is an example of the control IC according to the first aspect of the invention as described above. Therefore, the above description of the control IC according to the first aspect is correspondingly valid for the control IC 1 of FIG. 1.

The control IC 1 of FIG. 1 is a control IC for controlling an operating device for lighting means (e.g. at least one LED). The control IC 1 comprises a driver logic 3a for driving a hardware module 4a (as indicated in FIG. 1 by the arrow from the block 3a to the block 4a). The control IC 1 further comprises a control logic 2a for controlling the driver logic 3a (as indicated in FIG. 1 by the arrow from the block 2a to the block 3a). Furthermore, the control IC 1 comprises a clock generator 5 for generating two or more clock signals clk1 and clk2 that have a different frequency with regard to each other. The clock generator 5 is configured to provide a first clock signal clk1 of the two or more clock signals clk1 and clk2 to the control logic 2a (as indicated in FIG. 1 by the arrow from the block 5 to the block 2a). Moreover, the clock generator 5 is configured to provide a second clock signal clk2 of the two or more clock signals clk1 and clk2 to the driver logic 3a (as indicated in FIG. 1 by the arrow from the block 5 to the block 3a).

For being driven by the control IC 1, in particular the driver logic 3a, the hardware module 4a may be electrically connected to the driver logic 3a. The operation of the hardware module 4a may be controlled by the control logic 2a and the driver logic 3a. For this, the control logic may be configured to perform a control method, e.g. a feedforward control and/or a feedback control of an electrical quantity of the hardware module 4a. The electrical quantity may be a current (e.g. an output current), a voltage (e.g. an output voltage), electrical power (e.g. output power) etc. of the hardware module 4a. The terms "electrical quantity" and "electrical parameter" may be used as synonyms. The control logic 2a may be configured to control the driver logic 3a. That is, the driver logic 3a may be configured to generate based on the result or output of the control method performable by the control logic 2a a control signal, e.g. a PWM signal, an provide the control signal to the hardware module 4a. In other words, the driver logic 3a may be configured to generate, in line with or according to a control performable by the control logic 2a, a control signal for driving the hardware module 4a or controlling operation of the hardware module 4a.

The frequency of the first clock signal clk1 is different to the frequency of the second clock signal clk2. For example, the frequency of the first clock signal clk1 may be 40 MHz. The frequency of the second clock signal clk2 may be for example one of 80 MHz, 120 MHz and 160 MHz. These frequency values are only by way of example and, thus, not limiting for the present disclosure.

Since the second clock signal clk2 has a different frequency than the first clock signal clk1, the hardware module may operate or be clocked with a different frequency (i.e. working frequency) compared to the frequency used for clocking the control logic 2a (i.e. the frequency of the first clock signal clk1). Thus, the control IC 1 allows adapting the frequency with which the driver logic 3a is clocked, i.e. the frequency of the second control signal clk2, to the working frequency of the hardware module 4a, without having an impact on the clocking of other electrical components, e.g. the control logic 2a, of the control IC 1. As a result, hardware modules do not need to be designed and dimensioned to be driven in a similar frequency range in which the components, e.g. the control logic 2a, of the control IC 1 are clocked in order to be suited for being driven or controlled by the control IC 1. This is necessary in a control IC, in which a single clock signal is used for clocking all components of the control IC, which is not the case for the control IC 1 of FIG. 1.

As outlined above, the control IC 1 enables the clocking of the driver logic 3a to be adapted to the working frequency of the hardware module 4a by setting the frequency of the second clock signal clk2 to the working frequency or within a frequency range, for which the hardware module 4a is suited. Thus, a communication and a control of the hardware module 4a by the control IC 1 may be improved, compared to the case where the clocking of the components of the control IC is performed with a single clock signal that is only set to comply with clocking requirements of the components of the control IC.

The clock generator 5 may be configured to change the frequency of at least one clock signal, optional each clock signal, of the two or more clock signals clk1 and clk2. This may be done at start-up of the control IC 1 and/or during operation of control IC 1, for example during a clock adaptation phase. The clock adaptation phase may be triggered by a person. In addition or alternatively, the clock adaptation phase may be triggered by the hardware module 4a, when the hardware module 4a is electrically connected to the driver logic 3a of the control IC 1.

The clock generator 5 may be configured to adapt the second clock signal clk2 to the working frequency of the hardware module 4a. This may be done at start-up of the control IC 1. In addition or alternatively, this may be triggered by a person and/or by the hardware module 4a, when the hardware module 4a is electrically connected to the driver logic 3a of the control IC 1. Optionally, the hardware module 4a may provide information on its working frequency to the clock generator 5 (not shown in FIG. 1). The clock generator 5 may be configured to receive information on the working frequency of the hardware module 4a from outside the control IC 1.

Optionally, the clock generator 5 is configured to generate, using an oscillator, a base clock signal, the base clock signal having a frequency, which may be referred to as base frequency. The clock generator 5 may be configured to generate, based on the base clock signal, at least one clock signal of the two or more clock signals clk1 and clk2. The at least one clock signal has a frequency equal to or smaller than the base frequency. For example, the clock generator 5 may be configured to generate, based on the base clock signal, the two or more clock signals clk1 and clk2, wherein a respective frequency of the two or more clock signals has a frequency equal to or smaller than the base frequency. Thus, among the frequencies of the two or more clock signals clk1 and clk2 that may be generated by the clock generator 5, the frequency (base frequency) of the base frequency represents a maximum frequency, because the frequencies of the two or more clock signals clk1 and clk2 being different to each other are smaller than or equal to the base frequencies. Therefore, the clock generator 5 may be configured to generate the base clock signal having a maximum frequency. That is, the frequency (base frequency) of the base clock signal may be referred to as maximum frequency.

The clock generator 5 may be configured to generate the base clock signal using a phase-locked loop (PLL). The clock generator 5 may be configured to generate, based on the base clock signal, a respective clock signal (of the two or more clock signals clk1 and clk2) having a frequency smaller than the maximum frequency (base frequency of the bae clock signal) by reducing via a divider the maximum frequency of the base clock signal to the frequency of the respective clock signal. For example, the maximum frequency of the base clock signal may be equal to 160 MHz and the clock generator may be configured to generate one or more clock signals having different frequencies that are smaller than the maximum frequencies using a divider. The frequencies may be for example 40 MHz, 80 MHz and 120 MHz. This is only by way of example and, thus, not limiting the present disclosure.

As mentioned already above, the driver logic 3a may be configured to provide a control (e.g. PWM signal) for driving the hardware module 4a. The driver logic 3a may be configured to receive information from the hardware module 4a and provide the information to the control logic 2a, when the hardware module 4a is electrically connected to the driver logic 3a (this is not indicated in FIG. 1). The information receivable from the hardware module 4a may comprise or be information on the operating characteristics (e.g. the working frequency) of the hardware module 4a. The information receivable from the hardware module 4a may comprise or be measurement signals. A measurement signal may be understood as a signal or information representing a measurement result or sensing result of measurement means or a sensor. Examples of measurement means may comprise measurement means for measuring electrical parameters, such as voltage, current, electrical power, etc. of the hardware module 4a. Examples of a sensor may comprise temperature sensors, light sensors, movement and/or presence sensor etc. The optional measurement means and/or optional sensor may be part of the hardware module 4a, electrically connected to the hardware module 4a or associated with the hardware module 4a.

The control logic 2a may be configured to receive information from outside the control IC 1, optional from a microcontroller outside the control IC 1 (not shown in FIG. 1). The clock generator 5 may be configured to receive information from outside the control IC 1, optional from a microcontroller outside the control IC 1 (not shown in FIG. 1).

The information that may be receivable by the control logic 2a of the control IC 1 from outside may comprise control information (e.g. control parameters) with regard to controlling the hardware module 4a. In addition, the information may comprise information from components or modules outside the control IC 1, such as one or more sensors.

The control information may comprise information with regard to the hardware module 4a that is usable by the control logic 2a and optionally by the driver logic 3a for controlling operation of the hardware module 4a. For example, the control information may comprise a reference voltage for a feedback control of a voltage providable by the hardware module 4a, a reference current for a feedback control of a current providable by the hardware module 4a etc.

The information that may be receivable by the clock generator 5 of the control IC 1 from outside may be information with regard to the two or more clock signals clk1 and clk2 that may be generated by the clock generator 5 (e.g. parameters for generating the two or more clock signals). For example, this information may comprise information on which frequency of the two or more frequencies clk1 and clk2 is to be changed; and/or on the frequency to which the frequency of a respective clock signal (that is to be changed) is to be adapted to (e.g. the working frequency of the hardware module 4a to which the second clock signal's frequency is to be adapted). Optionally, the information receivable by the clock generator 5 may comprise information on the factor by which the frequency of a respective clock signal is smaller than the maximum frequency of the base clock signal (for use by the optional divider), the frequency of the first clock signal clk1 and/or the frequency of the second clock signal clk2.

For further details of the control IC 1 of FIG. 1 reference is made to the above description of the control IC according to the first aspect of the invention.

Figure 2:
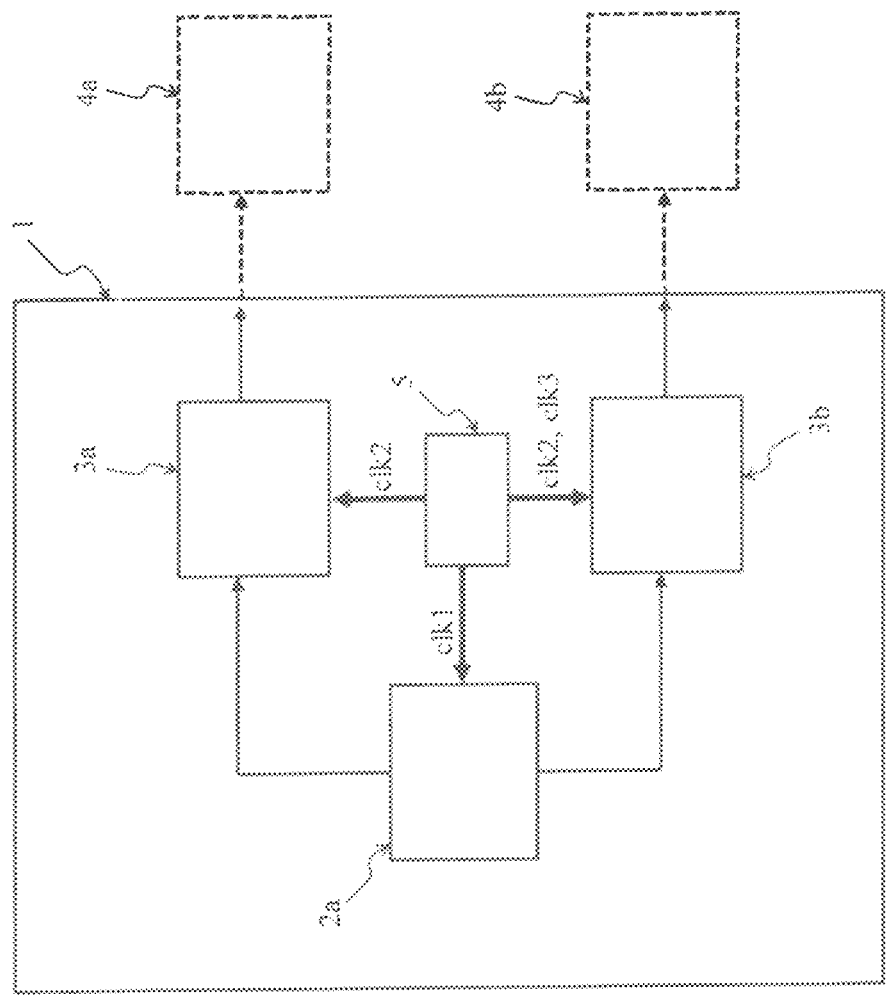
FIG. 2 shows a block diagram of a control IC according to an embodiment of the invention.

FIG. 2 shows a block diagram of a control IC according to an embodiment of the invention. The control IC 1 of FIG. 2 is an example of the control IC according to the first aspect of the invention as described above. Therefore, the above description of the control IC according to the first aspect is correspondingly valid for the control IC 1 of FIG. 2. The control IC 1 of FIG. 2 differs from the control IC 1 of FIG. 1 in that the control IC 1 of FIG. 2 comprises a further driver logic 3b. Therefore, the above description with regard to FIG. 1 is also valid for the control IC 1 of FIG. 2 and in the following mainly the differences with regard to the control IC 1 of FIG. 1 are described.

According to FIG. 2 the control IC 1 comprise a further driver logic 3b. This is only by way of example and, thus, the control IC 1 may comprise one or more further driver logics. For the following description it is assumed that the control IC 1 comprise one further driver logic 3b. The description with regard to the further driver logic 3b is correspondingly valid for the case that the control IC 1 comprise two or more further driver logics. The number of driver logics of the control IC may equal to the number of hardware modules that are to be controlled by the control IC.

Since the control IC 1 comprises two driver logics 3a and 3b, the control IC 1 is configured to control operation of two hardware modules 4a and 4b. The hardware module 4a may be electrically connected to the driver logic 3a and the hardware module 4b may be electrically connected to the further driver logic 3b.

As indicated in FIG. 2, the control logic 2a is configured to control the driver logic 3a and the further driver logic 3b.

The clock generator 5 is configured to provide either the second clock signal clk2 or a third clock signal clk3 having a different frequency than the first and second clock signals clk1 and clk2 to the further driver logic 3b for clocking the further driver logic 3b.

Thus, the further hardware module 4b may be driven by the control IC 1, in particular by the further driver logic 3b, with the same frequency used for the hardware module 4a (i.e. frequency of the second clock signal clk2) or with a different frequency compared to the frequency used for the hardware module 4a. Therefore, the control IC 1 of FIG. 2 may be configured to operate, at the same time, two hardware modules of the same type or at least having the same working frequency or a working frequency in the same frenemy range. In this case, the driver logic 3a and the further driver logic 3b are clocked with the second clock signal clk2. The control IC 1 may be configured to operate, at the same time, two hardware modules of different type or at least having different working frequencies. In this case, the driver logic 3a is clocked with the second clock signal clk2 and the further driver logic 3b is clocked with the third clock signal clk3.

The above description of the driver logic 3a of the control IC 1 of FIG. 1 is correspondingly valid for the further driver logic 3b of the control IC 1 of FIG. 2. The above description of FIG. 1 with regard to the second clock signal clk2 is correspondingly valid for the third clock signal clk3 that optionally may be generated by the clock generator 5 of the control IC 1 of FIG. 2. The above description of FIG. 1 with regard to information receivable by the control logic 2a and the clock generator 5 is correspondingly valid for the control IC 1 of FIG. 2 having the further driver logic 2.

For example, the information that may be receivable by the control logic 2a of the control IC 1 from outside may comprise control information (e.g. control parameters) with regard to controlling at least one of the hardware modules 4a and 4b. The control information may comprise information with regard to the hardware module 4b that is usable by the control logic 2a and optionally by the further driver logic 3b for controlling operation of the hardware module 4b. For example, the control information may comprise a reference voltage for a feedback control of a voltage providable by hardware module 4b, a reference current for a feedback control of a current providable by the hardware module 4b etc.

The information that may be receivable by the clock generator 5 of the control IC 1 from outside may be information with regard to the two or more clock signals clk1, clk2 and clk3 that may be generated by the clock generator 5 (e.g. parameters for generating the two or more clock signals). Optionally, the information receivable by the clock generator 5 may comprise information on the third clock signal clk3.

Figure 3:
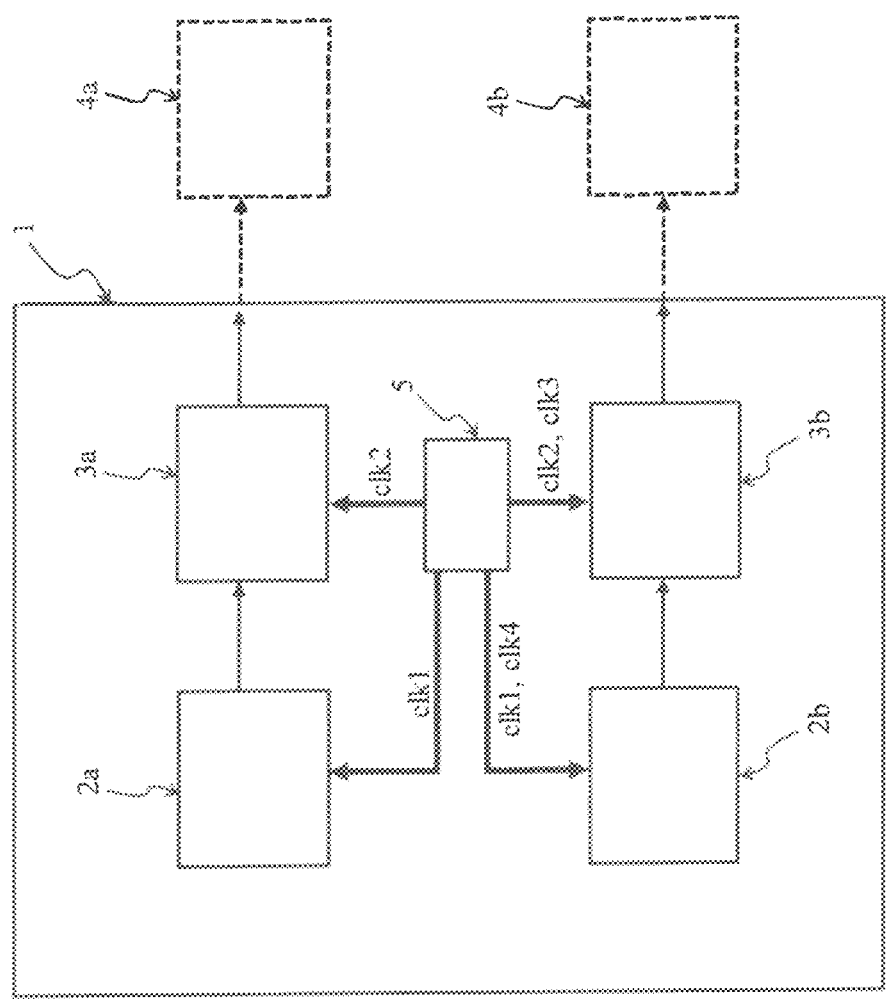
FIG. 3 shows a block diagram of a control IC according to an embodiment of the invention.

FIG. 3 shows a block diagram of a control IC according to an embodiment of the invention. The control IC 1 of FIG. 3 is an example of the control IC according to the first aspect of the invention as described above. Therefore, the above description of the control IC according to the first aspect is correspondingly valid for the control IC 1 of FIG. 3. The control IC 1 of FIG. 3 differs from the control IC 1 of FIG. 2 in that the control IC 1 comprises a further control logic 2b. Therefore, the above description with regard to FIGS. 1 and 2 is also valid for the control IC 1 of FIG. 3 and in the following mainly the differences with regard to the control IC 1 of FIG. 2 are described.

According to FIG. 3 the control IC 1 comprise a further control logic 2b. This is only by way of example and, thus, the control IC 1 may comprise one or more further control logics. For the following description it is assumed that the control IC 1 comprise one further control logic 2b. The description with regard to the further control logic 2b is correspondingly valid for the case that the control IC 1 comprise two or more further control logics.

As indicated in FIG. 3, the further control logic 2b is configured to control the further driver logic 3b, wherein the control logic 2a is configured to control the driver logic 3a.

The clock generator 5 is configured to provide either the first clock signal clk1 or a fourth clock signal clk4, having a different frequency than the first, second and optional third clock signals clk1, clk2 and clk3, to the further control logic 2b for clocking the further control logic 2b.

Thus, the further control logic 2b may be clocked with the same frequency used for the control logic 2a (i.e. frequency of the first clock signal clk1) or with a different frequency compared to the frequency used for the control logic 2a. Optionally, the number of control logics of the control IC 1 may be equal or less than the number of driver logics of the control IC 1.

The above description of the control logic 2a of the control IC 1 of FIGS. 1 and 2 is correspondingly valid for the further control logic 2b of the control IC 1 of FIG. 3. The above description of FIGS. 1 and 2 with regard to the first clock signal clk1 is correspondingly valid for the fourth clock signal clk4 that optionally may be generated by the clock generator 5 of the control IC 1 of FIG. 3. The above description of FIGS. 1 and 2 with regard to information receivable by the control logic 2a is correspondingly valid for information receivable by the further control logic 2b of the control IC 1 of FIG. 3.

For example, the information that may be receivable by the further control logic 2b of the control IC 1 from outside may comprise control information (e.g. control parameters) with regard to controlling the hardware module 4b. The control information may comprise information with regard to the hardware module 4b that is usable by the further control logic 2b and optionally by the further driver logic 3b for controlling operation of the hardware module 4b. For example, the control information may comprise a reference voltage for a feedback control of a voltage providable by the hardware module 4b, a reference current for a feedback control of a current providable by the hardware module 4b etc.

The information that may be receivable by the clock generator 5 of the control IC 1 from outside may be information with regard to the two or more clock signals clk1, clk2, clk3 and clk4 that may be generated by the clock generator 5 (e.g. parameters for generating the two or more clock signals). Optionally, the information receivable by the clock generator 5 may comprise information on the fourth clock signal clk4.

Figure 4:
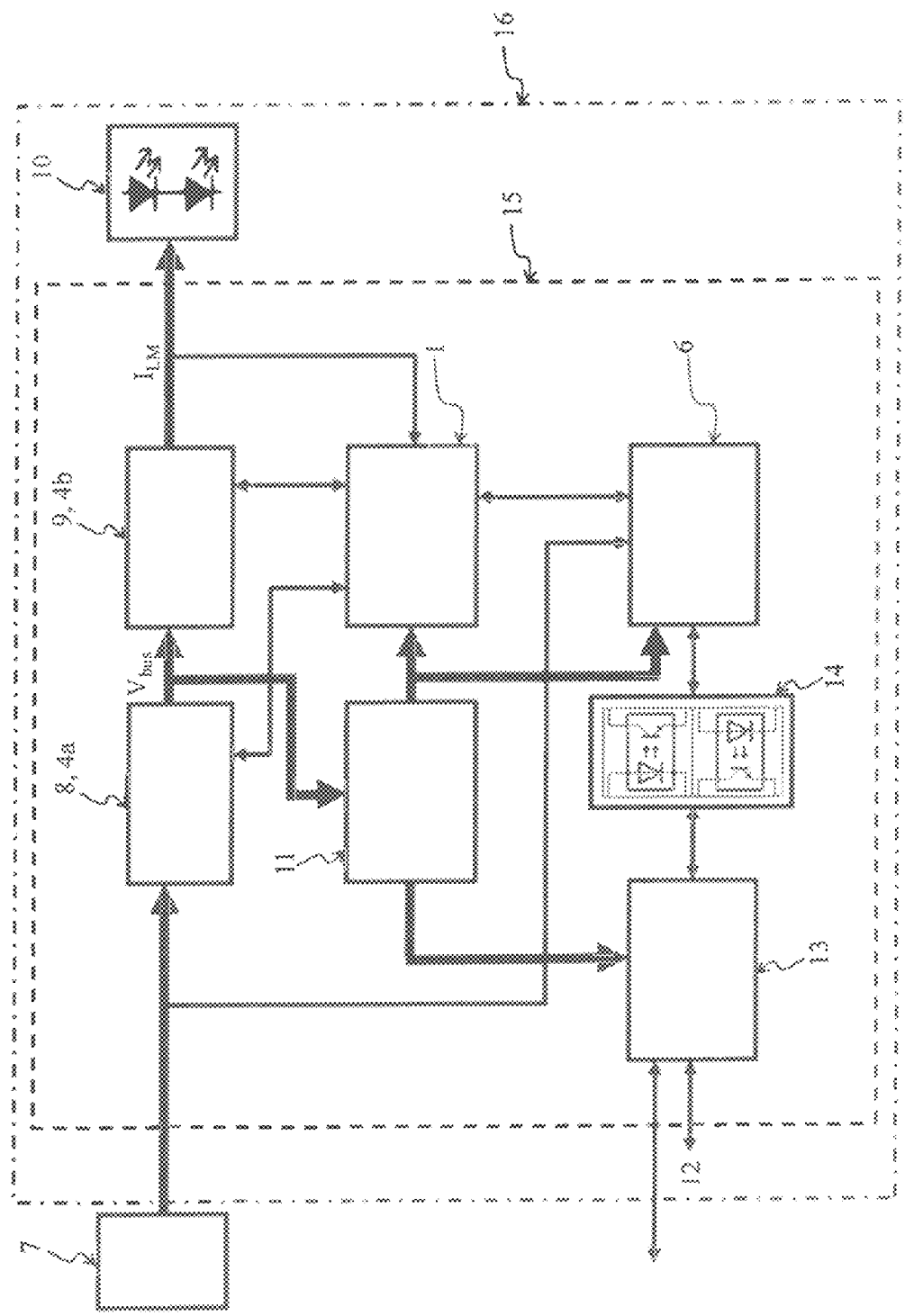
FIG. 4 shows a block diagram of a luminaire according to an embodiment of the invention.

FIG. 4 shows a block diagram of a luminaire according to an embodiment of the invention. The luminaire of FIG. 4 is an example of the luminaire according to the third aspect of the invention as described above. Therefore, the above description of the luminaire according to the third aspect is correspondingly valid for the luminaire of FIG. 4.

As shown in FIG. 4, the luminaire 16 comprises an operating device 15 and lighting means 10, wherein the operating device 15 is configured to operate the lighting means 10. The lighting means 10 may be one or more LEDs (i.e. at least one LED), as exemplarily shown in FIG. 4. The lighting means 10 may be alternatively or additionally any other lighting means type. The operating device 15 is an example of the operating device according to the second aspect. Thus, the description with regard to the operating device according to the second aspect is correspondingly valid for the operating device 15.

As shown in FIG. 4, the operating device 10 comprises a first hardware module 4a, a second hardware module 4b and a control IC 1 for controlling the first and second hardware modules 4a and 4b. The control IC 1 is an example of the control IC according to the first aspect and, thus, the description with regard to the control IC of the first aspect is correspondingly valid for the control IC 1. The control IC 1 may be the control IC 1 of FIG. 2 or the control IC 1 of FIG. 3, as described above. The control IC 1 may be for example an ASIC or a FPGA. The control IC 1 may comprise one or more control logics and two driver logics depending on the implementation form of the control IC 1.

The first hardware module 4a may be a voltage supply circuit 8 for providing a supply voltage $V_{bus}$ to electrically supply at least the second hardware module 4b. The second hardware module 4b may be a current source 9 configured to provide a current $I_{LM}$ to the lighting means 10.

The voltage supply circuit 8 may be an actively switched voltage supply circuit with at least one switch. The voltage supply circuit 8 may be configured to perform a power factor correction (PFC) function. Optionally, the voltage supply circuit 3 is an actively switched PFC circuit with at least one switch. The control IC 1, in particular the respective control logic and driver logic, may be configured to control switching of the at least one switch of the actively switched voltage supply circuit. The actively switched voltage supply circuit may comprise or may be an actively switched DC/DC converter with at least one switch. Optionally, the current source 9 may be an actively switched DC/DC converter with at least one switch, and the control IC 1, in particular the respective control logic and driver logic, is configured to control switching of the at least one switch.

Examples of an actively switched DC/DC converter comprise a buck-converter, boost-converter, buck-boost-converter, flyback converter, resonance converter etc. The at least one switch may be or may comprise one or more transistors. Examples of transistors comprise field-effect transistors (FETs), e.g. metal-oxide semiconductor FETs (MOSFETs); bipolar junction transistors (BJTs); insulated gate bipolar transistors (IGBTs) etc.

The control IC 1 is configured to control the current source 9 and, thus, control the current $I_{LM}$ providable by the current source 9. Optionally, the control IC 1 is configured to perform a feedback control and/or feedforward control of the current $I_{LM}$. The control IC 1 may be configured to control the voltage supply circuit 8 (e.g. PFC circuit) and, thus, the supply voltage $V_{bus}$. Optionally, the control IC 1 is configured to perform a feedback control and/or feedforward control of the supply voltage $V_{bus}$ The operating device 15, optionally the current source 9, may comprise a measurement unit for measuring the current $I_{LM}$ providable by the current source 9 (not shown in FIG. 4). The measurement unit may comprise or may be a shunt resistor. The control IC 1, in particular the driver logic for driving the current source 9, may be configured to receive the measurement of the current $I_{LM}$. For example, the control logic for controlling the driver logic for the current source may use the measurement of the current $I_{LM}$ for a feedback control of the current $I_{LM}$. The operating device 15, optionally the voltage supply circuit 8, may comprise a measurement unit for measuring the supply voltage $V_{bus}$ providable by the voltage supply circuit 8 (not shown in FIG. 4). The measurement unit may comprise or may be a voltage divider and/or magnetically coupled inductors. The control IC 1, in particular the driver logic for the voltage supply circuit 8, may be configured to receive the measurement of the supply voltage $V_{bus}$. For example, the control logic for controlling the driver logic for the voltage supply circuit 8 may use the measurement of the supply voltage $V_{bus}$ for a feedforward control of the current $I_{LM}$ and/or for a feedback control of the supply voltage $V_{bus}$.

Optionally, the operating device 15 may comprise a rectification and/or filter circuit (not shown in FIG. 4). This rectification and/or filter circuit may comprise filter means (e.g. EMI filter) and/or rectifier means. The rectification and/or filter circuit may be implemented in any way known in the art. The optional rectification and/or filter circuit, the voltage supply circuit 8 and the current source 9 may form an electrical energy supply circuit for providing electrical energy from an external electrical energy source 7, e.g. mains, to the lighting means 10. The voltage supply circuit 8 may be electrically supplied from the external electrical energy source 7 (in case the optional rectification and/or filter circuit is not present) or from the optional rectification and/or filter circuit. The optional rectification and/or filter circuit may be supplied from the external electrical energy source 7.

As shown in FIG. 4, the operating device 15 may comprise a microcontroller 6. The microcontroller 6 may be configured to provide information to the control IC 1, in particular to the one or more control logics of the control IC 1. The microcontroller 6 may be configured to provide information to the clock generator of the control IC 1.

The microcontroller 6 and the control IC 1 may form or represent a control system of the operating device 15 for controlling the hardware modules 4a and 4b of the operating device 15.

The microcontroller 6 may be configured to communicate with outside the operating device 15, e.g. an external device arranged outside the operating device. Such an external device may be part of the luminaire 16 or outside the luminaire 16. The microcontroller 6 may receive information from a person or user of the operating device 15 or the luminaire 16. Such information may comprise information on how to control the operating device 15 (e.g. control the hardware modules 4a and 4b) in order to control light emission by the lighting means 10. The information may comprise control information (e.g. control parameters) with regard to controlling the hardware modules 4a and 4b and information with regard to the two or more clock signals that may be generated by the clock generator of the control IC 1 (e.g. parameters for generating the two or more clock signals). In addition, the information may comprise information from other components or modules of the operating device 15 and/or the luminaire 16. In addition or alternatively, the information may comprise information from components or modules arranged outside the operating device 15 and/or outside the luminaire 16, such as one or more sensors. Thus, the information may comprise measurement signals, e.g. a measured light level, temperature, occupancy etc. at the environment of the operating device 15, the luminaire 16 and/or the lighting means 10. The one or more sensors may be part of the luminaire 16 or arranged outside the luminaire 16.

The control information may comprise information with regard to the hardware modules 4a and 4b that is usable by the one or more control logics and optionally by the driver logics for controlling operation of the hardware modules 4a and 4b. For example, the control information may comprise a reference voltage for a feedback control of the supply voltage $V_{bus}$ providable by the voltage supply circuit 8 (e.g.

PFC circuit) of the operating device 15, a reference current for a feedback control of the current $I_{LM}$ providable by the current source 9, a reference light emission for a feedback control of the light emission of the lighting means 10 etc.

The information with regard to the two or more clock signals may comprise information on the factor by which the frequency of a respective clock signal is smaller than the maximum frequency of the base clock signal, a respective working frequency of at least one of the hardware modules 4a and 4b, a respective clock frequency with which at least one of the one or more control logics of the control IC 1 are to be clocked etc. In addition or alternatively, the information with regard to the two or more clock signals may comprise the different frequencies of the two or more clock signals that may be generated by the clock generator of the control IC 1.

The microcontroller 6 may be configured to provide or communicate the above described control information to the one or more control logics of the control IC 1. Optionally, the microcontroller 6 may be configured to provide or communicate the above described control information to the drive logics of the control IC 1. The microcontroller 6 may be configured to provide or communicate the above described information with regard to the two or more clock signals to the clock generator of the control IC 1.

The control IC 1, in particular the one or more control logics, may be configure to control, based on information received from the microcontroller 6, the driver logics for controlling operation of the hardware modules 4a and 4b. For this, the driver logics of the control IC are configured to drive, according to their control, the respective hardware module of the hardware modules 4a and 4b.

The operating device 15 may comprise a communication interface 13 for communication to outside the operating device 15. Outside the operating device 15 may mean outside the luminaire 16. The microcontroller 6 may be configured to communicate via the communication interface 13. The control IC 1 may be configured to communicate information or data, e.g. received from the hardware modules 4a and 4b, to the microcontroller 6. The microcontroller 6 may communicate information received from the control IC 1 to the outside of the operating device 15 or the luminaire 16.

The communication interface 13 may be configured to communicate wirelessly and/or wire bound. The communication 13 interface may be a bus interface configured for being electrically connected to a bus 12. The bus 12 may be a wired bus. The bus 12 may be a digital bus, optionally a digital data bus. The bus 12 may be part of the luminaire 16. The bus 12 may be a DALI-bus or DALI-2 bus, i.e. a bus according to the DALI ("Digital Addressable Lighting Interface") standard or DALI-2 standard. They are well known standards in the field of lighting, wherein DALI-2 is the follow up standard of DALI. The bus 12 may be any other known bus type, such as a Distributed Systems Interface (DSI) bus. Thus, the communication interface 13 may be a DALI interface, a DALI-2 interface, a DSI interface etc.

As shown in FIG. 4, the microcontroller 6, may optionally be electrically connected to the communication interface 13 via an galvanic isolation circuit 14. For example, the isolation circuit 14 may comprise one or more optocouplers, one or more transformers etc. The microcontroller 6 may be configured to communicate via the communication interface 13 with outside the operating device 15, i.e. with an external unit outside the operating device 15. Outside the operating device 15 may optionally mean outside the luminaire 16.

Optionally, the operating device 15 may comprise a low voltage power supply 11 for electrically supplying the microcontroller 6, the control IC 1, and the communication interface 13. The low voltage power supply 11 may be electrically supplied with the supply voltage $V_{bus}$ providable by the voltage supply circuit 8.

For further details of the luminaire 16 of FIG. 4 reference is made to the above description of the luminaire according to the third aspect of the invention. For further details of the operating device 15 of FIG. 4 reference is made to the above description of the operating device according to the second aspect of the invention.

For further details of the control IC 1 of FIG. 4 reference is made to the above description of the control IC according to the first aspect of the invention and the above description of the control IC of FIGS. 1 to 3.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A control integrated circuit (control IC) (1), for controlling an operating device (15) for lighting means (10), wherein
the control IC (1) comprises
a driver logic (3a) for driving a hardware module (4a),
a control logic (2a) for controlling the driver logic (3a), and
a clock generator (5) for generating two or more clock signals (clk1, clk2) that have a different frequency with regard to each other; and
the clock generator (5) is configured to provide
a first clock signal (clk1) of the two or more clock signals (clk1, clk2) to the control logic (2a), and
a second clock signal (clk2) of the two or more clock signals (clk1, clk2) to the driver logic (3a); and wherein
the control IC (1) comprises at least one further driver logic (3b);
the control logic (2a) is configured to control the at least one further driver logic (3b); and
the clock generator (5) is configured to provide
the second clock signal (clk2) to the at least one further driver logic (3b), or
a third clock signal (clk3) of the clock signals to the at least one further driver logic (3b).

2. The control IC (1) according to claim 1, wherein the clock generator (5) is configured to change the frequency of at least one clock signal, optional each clock signal, of the two or more clock signals (clk1, clk2).

3. The control IC (1) according to claim 2, wherein the clock generator (5) is configured to change the frequency of the at least one clock signal, optional each clock signal, of the two or more clock signals (clk1, clk2) at start-up of the control IC (1).

4. The control IC (1) according to claim 1, wherein the clock generator (5) is configured to adapt the second clock signal (clk2) to the working frequency of the hardware module (4a).

5. The control IC (1) according to claim 1, wherein
the clock generator (5) is configured to generate, using an oscillator, a base clock signal, the base clock signal having a maximum frequency, and generate, based on the base clock signal, at least one clock signal, optional each clock signal, of the two or more clock signals (clk1, clk2), the at least one clock signal having a frequency equal to or smaller than the maximum frequency.

6. The control IC (1) according to claim 5, wherein the clock generator (5) is configured to generate the base clock signal using a phase-locked loop, PLL; and/or generate, based on the base clock signal, the at least one clock signal having a frequency smaller than the maximum frequency by reducing via a divider the maximum frequency of the base clock signal to the frequency of the at least one clock signal.

7. The control IC (1) according to claim 1, wherein the driver logic (3a) is configured to provide a control signal, optional PWM signal, for driving the hardware module (4a), and receive information, optional measurement signals, from the hardware module (4a) and provide the information to the control logic (2a), when the hardware module (4a) is electrically connected to the driver logic (3a).

8. The control IC (1) according to claim 1, wherein the control logic (2a) is configured to receive information from from a microcontroller outside the control IC (1), and/or the clock generator (5) is configured to receive information on the factor by which the frequency of the at least one clock signal is smaller than the maximum frequency of the base clock signal, from a microcontroller outside the control IC (1).

9. A control integrated circuit (control IC) (1), for controlling an operating device (15) for lighting means (10), wherein the control IC (1) comprises a driver logic (3a) for driving a hardware module (4a), a control logic (2a) for controlling the driver logic (3a), and a clock generator (5) for generating two or more clock signals (clk1, clk2) that have a different frequency with regard to each other; and the clock generator (5) is configured to provide a first clock signal (clk1) of the two or more clock signals (clk1, clk2) to the control logic (2a), and a second clock signal (clk2) of the two or more clock signals (clk1, clk2) to the driver logic (3a): wherein the control IC (1) comprises at least one further driver logic (3b) and at least one further control logic (2b);

the at least one further control logic (2b) is configured to control the at least one further driver logic (3b);

the clock generator (5) is configured to provide the second clock signal (clk2) to the at least one further driver logic (3b), or a third clock signal (clk3) of the clock signals to the at least one further driver logic (3b), and the clock generator (5) is configured to provide the first clock signal (clk1) to the at least one further control logic (2b), or a fourth clock signal (clk4) of the clock signals to the at least one further control logic (2b).

10. An operating device (15) for lighting means (10), wherein the operating device (15) comprises a control IC (1) according to claim 1, and one or more hardware modules (4a, 4b, 8, 9), optional a power factor control circuit (8), PFC circuit, and/or a current source (9) for providing current to the lighting means (10); and the control IC (1) is configured to control the one or more hardware modules (4a, 4b, 8, 9).

11. The operating device (15) according to claim 10, wherein the operating device (15) comprises a microcontroller (6), and the microcontroller (6) is configured to provide information to the control logic (2a) and the at least one further control logic (2b), and/or provide information to the clock generator (5), optional on the factor by which the frequency of the at least one clock signal is smaller than the maximum frequency of the base clock signal.

12. The operating device (15) according to claim 10, wherein the control IC (1) comprises for each hardware module of the one or more hardware modules (4a, 4b, 8, 9) a respective driver logic (3a, 3b), each of the one or more hardware modules (4a, 4b, 8, 9) is electrically connected to the respective driver logic (3a, 3b) of the control IC (1), and at least one of the one or more hardware modules (4a, 4b, 8, 9) is configured to provide measurement signals to the respective driver logic (3a, 3b) of the control IC (1).

13. A luminaire (16) comprising an operating device (15) according to claim 10, and lighting means (10); wherein the operating device (15) is configured to operate the lighting means (10).

14. The control IC (1) according to claim 1 wherein the lighting means comprises at least one light emitting diode (LED).

15. The operating device (15) according to claim 10, wherein the lighting means comprises at least one light emitting diode (LED).

16. The luminaire (16) according to claim 13 wherein the lighting means comprises at least one light emitting diode (LED).

* * * * *